Patented Feb. 22, 1944

2,342,416

UNITED STATES PATENT OFFICE 2,342,416

MANUFACTURE OF LOWER FATTY ACID ESTERS OF CELLULOSE

Carl J. Malm, Rochester, N. Y., assignor to Eastman Kodak Company, Rochester, N. Y., a corporation of New Jersey No Drawing. Application March 28, 1942, Serial No. 436,717

12 Claims. (Cl. 260—229)

This application relates to a method of preparing cellulose esters by first pretreating part of the cellulose with lower fatty acid and sulfuric acid followed by adding the remainder of the cellulose to the pretreating acid and supplying more sulfuric acid to the mass.

In my previously filed applications Serial No. 378,249, filed February 10, 1941, and Serial No. 417,166, filed October 30, 1941, a method was described for pretreating cellulose in which part of the cellulose was mixed with lower fatty acid and sulfuric acid followed by addition of the remainder of the cellulose and continued mixing until the cellulose was activated to the desired degree. Those pretreatment methods are satisfactory as far as conditioning of the cellulose for esterification is concerned. However, with many types of mixing equipment I have found that the addition of a second portion of cellulose, particularly using but a small proportion of liquid to cellulose, still puts too much strain upon the mixing equipment. This does not appear to be present in the first portion of the pretreatment, in accordance with the descriptions in those applications, but only after the second portion of cellulose is added.

One object of my invention is to provide a method of pretreating cellulose to prepare it for esterification in which the strain on the equipment employed in mixing the cellulose in the pretreatment is reduced to a minimum. Other objects of my invention will appear herein.

It was pointed out in my prior applications that the pretreatment methods described and claimed there are particularly useful for the preparation of cellulose esters in which the proportion of liquid to cellulose is reduced to a minimum. In order to reduce this liquid to cellulose ratio to a minimum, it is necessary that the amount of liquid employed in the pretreatment of the cellulose be low. The inventions of my prior applications were for the purpose of providing a pretreatment method using a low proportion of liquid to cellulose in the pretreatment. I have now found that by adding a small amount of sulfuric acid to the pretreatment mass upon the addition of each portion of cellulose that there is less resistance to mixing or stirring, thus alleviating the strain upon the equipment all through the pretreatment operation. It appears that the first portion of cellulose absorbs practically all of the sulfuric acid which is present in the pretreating liquid so that when a subsequent portion of cellulose is added the portion of sulfuric acid present is so small that the tenderizing or conditioning effect obtained upon the first portion of cellulose is not obtained upon the addition of subsequent portions. This coupling with the small amount of liquid which is present produces a mass still having considerable internal friction, and, therefore, it is either necessary that a mixer of extraordinarily rigid construction be used or else further sulfuric acid be added to tenderize or condition the cellulose, thereby reducing its internal friction.

In those cases where the preparation of a low viscosity ester is desired, the amount of sulfuric acid employed in the pretreatment will be sufficiently large that it can be divided into portions which are added with each addition of cellulose as there will be sufficient sulfuric acid in each case to cause conditioning of the cellulose. In the preparation of high viscosity esters, on the other hand, the proportion of sulfuric acid employed for the initial portion of cellulose is small and therefore additional amounts of sulfuric acid are preferably added with the subsequent portions of cellulose to produce the desired degree of tenderizing or conditioning of the cellulose.

In its essential features the pretreatment, in accordance with the present invention, is carried out in substantially the same manner as that of my prior applications except that sulfuric acid is added not only initially but also when subsequent portions of cellulose are added to the pretreating mass.

My invention is particularly concerned with the preparation of cellulose esters having a high propionyl or butyryl content because with the preparation of those esters it is especially desirable to have present in the esterification bath a high proportion of propionic or butyric anhydride, based upon the total liquid in the bath. This is obtained by keeping the proportion of liquid to cellulose down in the esterification mass. In order to assure a low liquid to cellulose ratio and a high anhydride ratio in the esterification mass, it is desirable to pretreat the cellulose with as small a proportion of lower fatty acid as is possible.

In accordance with my invention, it is possible to use less than two parts of lower fatty acid in the activation of one part of cellulose. Preferably the amount of liquid in the pretreatment, in accordance with my invention, is three-quarter parts of lower fatty acid to one of cellulose. As four parts of anhydride is ordinarily necessary, particularly in preparing high butyryl or high propionyl cellulose esters, this preferred proportion of liquid in the pretreatment allows a restriction of the liquid to cellulose ratio in the esterification of 4.75:1.

In the pretreatment of the cellulose, in accordance with my invention, the mass of cellulose and acid is thoroughly mixed by stirring, kneading or agitation. By adding sulfuric acid with subsequent additions of cellulose, as well as initially, this mixing is facilitated, particularly in treating the latter portions of cellulose. The amount of breakdown of the cellulose in my pretreatment method depends upon the viscosity desired for the resulting product. If a high viscosity product is desired, the treatment should not be for so long a time as in the preparation of a low viscosity product. Both the use of a longer time of treatment and the use of a higher proportion of sulfuric acid or higher temperatures in the pretreatment of cellulose, in accordance with my invention, contributes to a lowered viscosity product.

If the addition of further amounts of sulfuric acid with the various additions of cellulose involves a larger total amount of sulfuric acid than would be desired with the usual pretreatment temperature for the preparation of esters of the viscosity desired, it is then desirable to carry out that pretreatment at lower temperatures than are employed with the smaller proportions of sulfuric acid. Thus the larger amount of sulfuric acid, because of the lowered temperature, will give the desired mechanical breakdown of the cellulose fibers without a greater amount of chemical breakdown than is desired, the latter determining the viscosity of the final product.

My invention broadly comprises dividing up of the cellulose to be acylated into a plurality of portions. Ordinarily dividing into two parts is sufficient. A portion of this cellulose is mixed in a mixing vessel with a mixture of ¼ to 2 parts of lower fatty acid and a small proportion of sulfuric acid, the proportion of the latter depending upon the viscosity-type product which is to be prepared. After thoroughly mixing the liquid and cellulose together, the time depending upon the amount of breakdown desired, a further portion of cellulose is added to the mixture together with an additional proportion of sulfuric acid. Ordinarily dividing the cellulose into two parts is sufficient for most practical purposes, therefore this second portion will be the remainder of the cellulose to be esterified. The mixing is then conducted until the cellulose has become activated to the desired degree so that upon the addition of lower fatty acid anhydride, and in most cases also a further catalyst, the cellulose is readily esterified.

In the pretreatment of cellulose, in accordance with my invention, the lower fatty acid employed may be acetic acid or propionic acid or a mixture of propionic and acetic acids. In some cases even some butyric acid may be present. However, I have found that the use of acetic and propionic acids give satisfactory results and are preferred in pretreatment processes, following the method which I have described. It appears that in the esterification processes which I have performed the best activation of the cellulose has been obtained when acetic acid was the sole fatty acid used therein. If, on the other hand, however, the proportion of acetyl in the resulting product should be reduced to a minimum, satisfactory pretreatment can be obtained with a lower fatty acid containing a large proportion or even consisting entirely of propionic acid. In any case it is desirable that the pretreating liquid be composed solely of lower fatty acid and a small proportion of sulfuric acid catalyst.

The following examples illustrate my invention:

Example I

Three pounds of acetic acid, containing 3 cc. of sulfuric acid, were added to a five gallon mixing vessel. Two pounds of refined cotton linters were added and the mixer was run for 45 minutes at 75° F. Two pounds more of refined cotton linters were added followed by a mixture of 3 cc. of sulfuric acid and 5 cc. of acetic acid. The mixer was run for 30 minutes more at 75° F. The esterification was then conducted by adding 16 pounds of butyric anhydride which had been cooled to 30° F. followed by the addition of 12 cc. of sulfuric acid diluted with 20 cc. of acetic acid. The reaction was allowed to proceed slowly to a maximum temperature of 90° F. After a total reaction time of 10 hours, a smooth viscous solution was obtained.

Example II

Three pounds of a mixture consisting of 80% propionic acid and 20% acetic acid and containing 3 cc. of sulfuric acid were added to a five gallon mixer. The process was conducted from this point on the same as in the preceding example. A smooth, clear solution was obtained. The viscous solutions in both this and the preceding example were each diluted with sufficient acetic acid to impart fluidity thereto and they were precipitated by pouring into agitated dilute acid.

Example III

A mixture of 480 pounds of acetic and 100 cc. of sulfuric acid was added to a 600 gallon Werner-Pfleiderer mixer. 400 pounds of refined cotton linters were added thereto and the mixer was run for one-half hour at 100° F. An additional 200 pounds of cotton linters was then added followed by a mixture of 100 cc. of sulfuric acid and 50 cc. of acetic acid. The mixer was run for 45 minutes more or until a sample of cellulose, upon washing and drying, exhibited sufficient crumbliness to show that the desired viscosity breakdown had occurred. 2400 pounds of butyric anhydride was added. The mass was cooled to 50° F. and 4000 cc. of sulfuric acid diluted with 10 lbs. of acetic acid was stirred into the mass. The esterification was conducted so that the maximum temperature did not exceed 90° F. A very brilliant viscous solution was obtained. The product was precipitated by sufficient dilution with acetic acid to cause flowability and then pouring into dilute acid. If desired, however, the ester may be hydrolyzed by adding aqueous acetic acid to the solution before its precipitation and allowing it to stand at 100° F. such as for 100 hours, the time of standing depending upon the amount of hydrolysis desired.

The term "parts," when referred to herein and in the claims appended hereto, refers to parts by weight.

I claim:

1. In a process of preparing lower fatty acid esters of cellulose the method for the pretreatment of the cellulose to be esterified which comprises mixing a substantial portion of it with a pretreating liquid essentially consisting of saturated fatty acid of 2-4 carbon atoms, fatty acid of 2-3 carbon atoms predominating, and sufficient sulfuric acid to only partially break down the cellulose physically, the pretreating liquid being ¼-2 parts per part of the cellulose to be esterified, adding the remainder of the cellulose to be esterified and additional sulfuric acid to the mass and continuing the pretreatment until the cellulose is activated.

2. In a process of preparing a cellulose ester having a high butyryl content in which the cellulose is esterified with butyric anhydride the method for the pretreatment of the cellulose which comprises mixing a substantial portion of the cellulose with a pretreating liquid essentially consisting of saturated fatty acid of 2-4 carbon atoms, fatty acid of 2-3 carbon atoms predominating, and sufficient sulfuric acid to only partially break down the cellulose physically, the pretreating liquid being ¼-2 parts per part of cellulose to be esterified, adding the remainder of the cellulose to be esterified and additional sulfuric acid to the mass and continuing the pretreatment until the cellulose is activated.

3. In a process of preparing a cellulose ester having a high propionyl content in which the cellulose is esterified with propionic anhydride the method for the pretreatment of the cellulose which comprises mixing a substantial portion of the cellulose with a pretreating liquid essentially consisting of saturated fatty acid of 2-4 carbon atoms, fatty acid of 2-3 carbon atoms predominating, and sufficient sulfuric acid to only partially break down the cellulose physically, the pretreating liquid being ¼-2 parts per part of cellulose to be esterified, adding the remainder of the cellulose to be esterified and additional sulfuric acid to the mass and continuing the pretreatment until the cellulose is activated.

4. In a process of preparing lower fatty acid esters of cellulose the method for the pretreatment of the cellulose to be esterified which comprises mixing a substantial portion of it with a pretreatment liquid essentially consisting of saturated fatty acid of 2-4 carbon atoms, fatty acid of 2-3 carbon atoms predominating, and sufficient sulfuric acid to only partially break down the cellulose physically, the pretreating liquid being ¼-2 parts per part of the cellulose to be esterified, adding in one portion the remainder of the cellulose to be esterified and additional sulfuric acid to the mass and continuing the pretreatment until the cellulose is activated.

5. In a process of preparing lower fatty acid esters of cellulose the method for the pretreatment of the cellulose to be esterified which comprises mixing a substantial portion of it with a pretreatment liquid essentially consisting of saturated fatty acid of 2-4 carbon atoms, fatty acid of 2-3 carbon atoms predominating, and sufficient sulfuric acid to only partially break down the cellulose physically, the pretreating liquid being ¼-2 parts per part of the cellulose to be esterified, adding in a plurality of portions the remainder of the cellulose to be esterified and additional sulfuric acid to the mass and continuing the pretreatment until the cellulose is activated.

6. In a process of preparing lower fatty acid esters of cellulose the method for the pretreatment of the cellulose to be esterified which comprises mixing a substantial portion of it with a pretreating liquid essentially consisting of saturated fatty acid of 2-4 carbon atoms, fatty acid of 2-3 carbon atoms predominating, and sufficient sulfuric acid to only partially break down the cellulose physically, the pretreating liquid being ¾-2 parts per part of the cellulose to be esterified, adding the remainder of the cellulose to be esterified and additional sulfuric acid to the mass and continuing the pretreatment until the cellulose is activated.

7. In a process of preparing lower fatty acid esters of cellulose the method for the pretreatment of the cellulose to be esterified which comprises mixing a substantial portion of it with a pretreating liquid essentially consisting of acetic acid and sufficient sulfuric acid to only partially break down the cellulose physically, the pretreating liquid being ¼-2 parts per part of the cellulose to be esterified, adding the remainder of the cellulose to be esterified and additional sulfuric acid to the mass and continuing the pretreatment until the cellulose is activated.

8. In a process of preparing lower fatty acid esters of cellulose the method for the pretreatment of the cellulose to be esterified which comprises mixing a substantial portion of it with a pretreating liquid essentially consisting of propionic acid and sufficient sulfuric acid to only partially break down the cellulose physically, the pretreating liquid being ¼-2 parts per part of the cellulose to be esterified, adding the remainder of the cellulose to be esterified and additional sulfuric acid to the mass and continuing the pretreatment until the cellulose is activated.

9. In a process of preparing lower fatty acid esters of cellulose the method for the pretreatment of the cellulose to be esterified which comprises mixing one-half of it with a pretreating liquid essentially consisting of saturated fatty acid of 2-4 carbon atoms, fatty acid of 2-3 carbon atoms predominating, and sufficient sulfuric acid to only partially break down the cellulose physically, the pretreating liquid being ¼-2 parts per part of the cellulose to be esterified, adding the remainder of the cellulose to be esterified and additional sulfuric acid to the mass and continuing the pretreatment until the cellulose is activated.

10. A process of making cellulose esters which comprises pretreating the cellulose to be esterified by mixing a substantial portion of it with a pretreating liquid essentially consisting of saturated fatty acid of 2-4 carbon atoms, fatty acid of 2-3 carbon atoms predominating, and sufficient sulfuric acid to only partially break down the cellulose physically, the pretreating liquid being ¼-2 parts per part of the cellulose to be esterified, adding the remainder of the cellulose to be esterified and additional sulfuric acid to the mass and continuing the treatment then adding lower fatty acid anhydride thereto, that of fatty acids of 3-4 carbon atoms predominating, and esterifying the cellulose until the cellulose has been converted into an ester.

11. A process of preparing a cellulose ester which comprises pretreating the cellulose in portions by first subjecting a substantial portion to the action of lower saturated fatty acid and sulfuric acid and then adding the remainder of the cellulose and further sulfuric acid thereto and continuing the treatment and subsequently esterifying the cellulose by adding an esterifying amount of butyric anhydride to the mass and continuing the esterification until substantially complete esterification of the cellulose has occurred.

12. A process of preparing a cellulose ester having a high butyryl content which comprises pretreating the cellulose by first mixing a substantial portion of it with propionic acid and a small amount of sulfuric acid followed by adding the remainder of the cellulose and additional sulfuric acid to the mass and continuing the pretreatment until the cellulose is activated and subsequently adding an esterifying amount of a butyric anhydride to the mass and continuing the esterification until the cellulose has been completely esterified.

CARL J. MALM.